United States Patent
Cordle et al.

(10) Patent No.: US 9,536,559 B1
(45) Date of Patent: **\*Jan. 3, 2017**

(54) DETERMINING A HAMR LASER POWER THAT REDUCES ADJACENT TRACK INTERFERENCE

(71) Applicant: Seagate Technology LLC, Cupertino, CA (US)

(72) Inventors: Michael A. Cordle, Eagan, MN (US); Tim Rausch, Farmington, MN (US); Franklin P. Martens, Bloomington, MN (US)

(73) Assignee: SEAGATE TECHNOLOGY LLC, Cupertino, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/928,717

(22) Filed: Oct. 30, 2015

(51) Int. Cl.
| | |
|---|---|
| G11B 5/09 | (2006.01) |
| G11B 20/10 | (2006.01) |
| G11B 7/1263 | (2012.01) |
| G11B 5/00 | (2006.01) |
| G11B 20/18 | (2006.01) |
| G11B 5/455 | (2006.01) |
| G11B 5/012 | (2006.01) |

(52) U.S. Cl.
CPC ........... *G11B 20/10212* (2013.01); *G11B 5/09* (2013.01); *G11B 7/1263* (2013.01); *G11B 5/012* (2013.01); *G11B 5/455* (2013.01); *G11B 20/10305* (2013.01); *G11B 20/1816* (2013.01); *G11B 2005/0021* (2013.01)

(58) Field of Classification Search
None
See application file for complete search history.

(56) References Cited

U.S. PATENT DOCUMENTS

| | | |
|---|---|---|
| 7,102,838 B2 | 9/2006 | Kim et al. |
| 8,760,779 B2 | 6/2014 | Johns et al. |
| 8,797,672 B2 | 8/2014 | Tanabe et al. |
| 8,929,186 B1 * | 1/2015 | Sharma ............... G11B 5/012 369/47.5 |
| 9,082,458 B1 | 7/2015 | Tang |
| 2014/0043708 A1 | 2/2014 | Erden et al. |
| 2014/0055881 A1 | 2/2014 | Zaharris |

\* cited by examiner

*Primary Examiner* — Brian Butcher
(74) *Attorney, Agent, or Firm* — Hollingsworth Davis, LLC

(57) ABSTRACT

A laser power applied to a recording head is changed for a plurality of iterations. Each iteration involves, via the recording head at each laser power, writing multiple adjacent tracks to a heat-assisted recording medium and determining a bit error rate for at least one of the adjacent tracks at each laser power. A first laser power is found that achieves a minimum bit error rate of the iterations. An operational value of laser power that is smaller than the first laser power is used during operational recording to reduce adjacent track interference.

20 Claims, 6 Drawing Sheets

DETERMINING A HAMR LASER POWER THAT REDUCES ADJACENT TRACK INTERFERENCE

SUMMARY

The present disclosure is directed to a method, system, and apparatus used to determine a heat-assisted magnetic recording laser power that reduces adjacent track interference. In one embodiment, a laser power applied to a recording head is changed for a plurality of iterations. Each iteration involves, via the recording head at each laser power, writing multiple adjacent tracks to a heat-assisted recording medium and determining a bit error rate for at least one of the adjacent tracks at each laser power. A first laser power is found that achieves a minimum bit error rate of the iterations. An operational value of laser power that is smaller than the first laser power is used during operational recording to reduce adjacent track interference.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to determining record settings in devices that use heat-assisted media recording (HAMR). This technology, also referred to as energy-assisted media recording (EAMR), thermally-assisted media recording (TAMR), and thermally-assisted recording (TAR), uses an energy source such as a laser to heat a small spot on a recording medium (e.g., magnetic disk) during recording. The heat lowers magnetic coercivity at the hot spot, allowing a write transducer to change magnetic orientation. Due to the relatively high coercivity of the recording medium after cooling, the data is less susceptible to paramagnetic effects that can lead to data errors.

The areal density of data written on the recording medium is a function of the track width (tracks-per-inch) and the linear bit density along each track (bits-per-inch). These two parameters may be affected by a number of design choices, including the size of the hot spot and the strength/extent of the magnetic field of the write transducer. For example, the hot spot can made much smaller than the extent of the magnetic field, and so the hot spot can be used to control the size of the recorded bit. This is because regions outside the hot spot are not affected by the field due to the high magnetic coercivity at ambient temperature.

Figure 1:
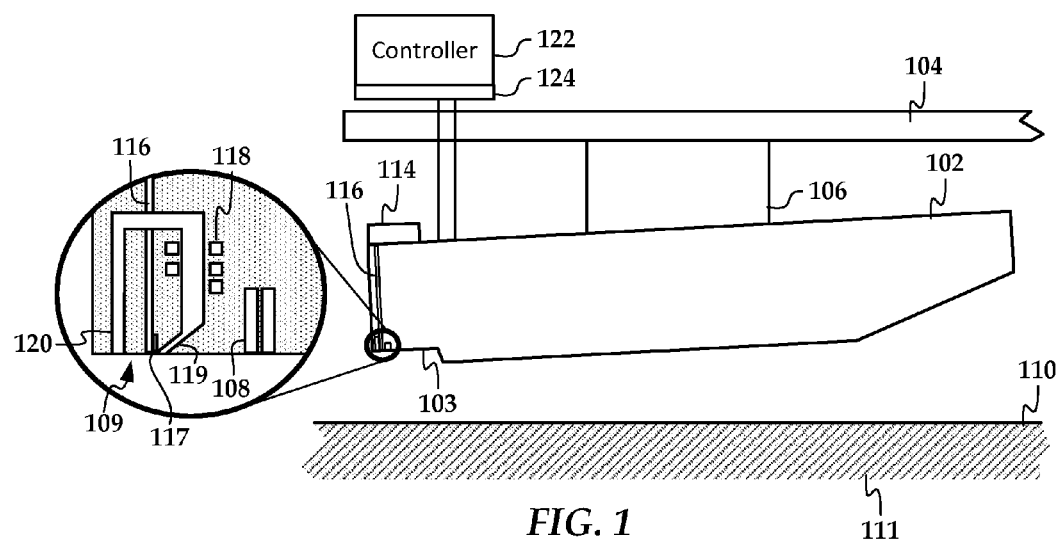
FIG. 1 is a block diagram of a hard drive slider and media arrangement according to an example embodiment.

During qualification of a HAMR disk drive, the laser is calibrated along with other parts of the read/write head to ensure it provides a hot spot within a defined tolerance. The present disclosure describes calibration of laser diode current in a HAMR disk drive to provide acceptable bit error rate while accounting for the effects of adjacent track interference. In order to better understand the types of devices that may be calibrated in this way, a HAMR read/write head 102 according to an example embodiment is shown in the block diagram of FIG. 1.

The read/write head 102 may be used in a HAMR data storage device, e.g., HAMR magnetic hard disk drive (HDD). The read/write head 102 may also be referred to herein as a slider, read head, recording head, write head, etc. The read/write head 102 is coupled to an arm 104 by way of a suspension 106, e.g., a gimbal. The read/write head 102 includes at least one read transducer 108 and at least one write transducer 109 at a media-facing surface 103. The transducers 108, 109 are held proximate to a surface 110 of a magnetic recording medium 111, e.g., magnetic disk.

The read/write head 102 includes a laser 114 coupled to an optical path 116 integrated into the read/write head 102. The optical path 116 delivers energy to a near-field transducer 117 that is part of the write transducer 109. The near-field transducer 117 achieves surface plasmon resonance in response to the optical energy, and directs the surface plasmons to heat a surface of the recording medium 111 when recording data. The write transducer 109 also includes a write coil 118, write pole 119, and return pole 120. While the recording medium 111 is being heated, the write coil 118 is energized to create a magnetic field that is directed to the recording medium via a respective write pole 119 and return pole 120.

A controller 122 includes logic circuits that control current supplied to the laser 114, as well as controlling the as sending and receiving of signals to and from the recording head. Those signals include read and write channel data, adaptive fly height control signals, etc. An interface 124 conditions the signals between the controller 120 and the read/write head, performing pre-amplification, filtering, analog-to-digital conversion, digital-to-analog conversion, encoding, decoding, etc.

A number of different algorithms have been devised to optimize laser power in the HAMR factory drive process. For example, isolated, single-track bit error rate (BER) and squeezed, triple-track BER can be determined as a function of laser power. In embodiments described below, triple-track BER is measured from a middle of three tracks written at a nominal or squeezed track pitch/spacing, e.g., between 0% and 15% less than nominal track pitch. For purposes of this disclosure, a nominal track pitch (0% squeezed) will also be referred to as unsqueezed. A difference between the single and triple-track BER measurements is used to derive a laser current. Another method looks only at the squeezed triple-track error rate versus laser current and converges at the minima. While these procedures can minimize error rate for a target track, they do not expressly account for the effects of adjacent track interference (ATI) on neighboring tracks.

Figure 2:
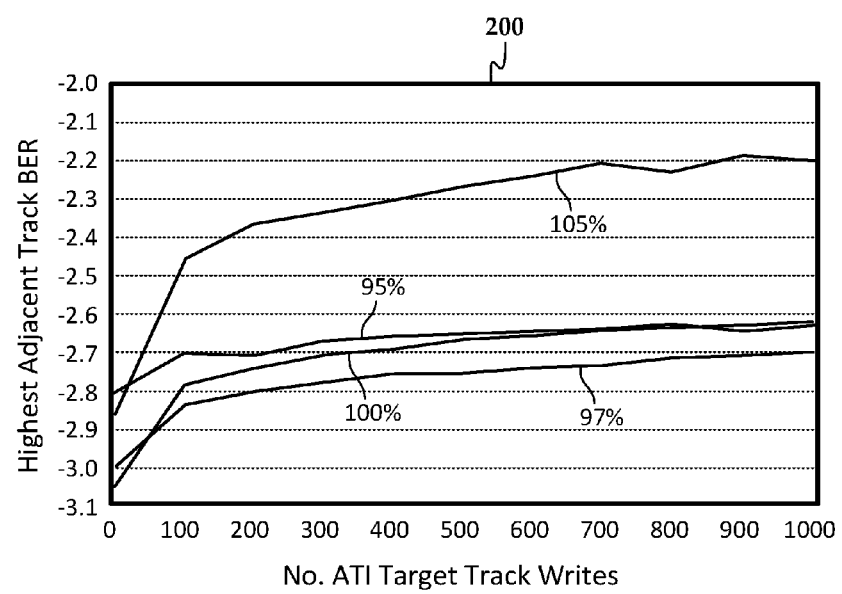
FIG. 2 is a graph showing how laser power can affect adjacent track interference in a device according to an example embodiment.

In FIG. 2, a graph 200 illustrates an example of how laser power can affect ATI in a HAMR device according to an example embodiment. The curves represent the effects of ATI as a function of the number of adjacent track writes at three laser settings (95%, 97%, and 105%) normalized to the a laser current (100%) selected by minimum squeezed triple-track BER method described above. The ATI is measured by repeatedly writing a middle of three tracks (the target track) for a number of times indicated by the x-axis, and determining the highest BER of the two surrounding adjacent tracks. As expected, the first point on the 100% curve has the best error rate after only a single target track write, as minimum BER is the criteria used to select the 100% power level. However, the adjacent track BER increases as the number of target track writes increase. The chart shows that when the laser current is increased by 5% (105% curve), the starting BER is worse and the BER loss due to ATI is significantly increased. The case where IOP is decreased by 5% (95% curve) also has a poorer starting BER, but better overall ATI performance after more tracks are written.

Figure 3:
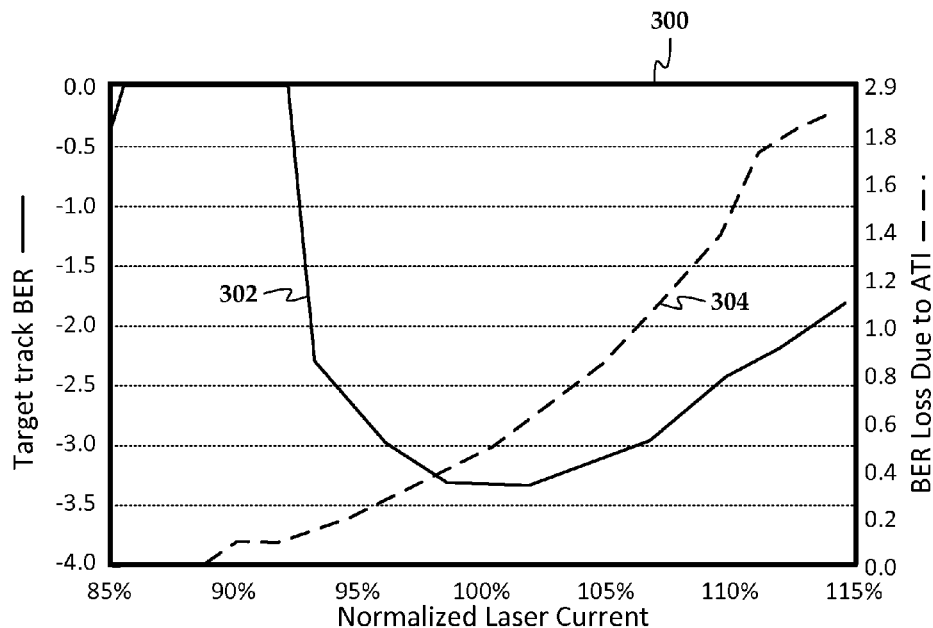
FIG. 3 is a graph showing relationship between squeezed bit error rate and adjacent track interference as a function laser power according to an example embodiment.

The laser calibration described herein utilizes the result indicated by the 97% curve, where decreasing the laser current by 3% results in a minimal increase in starting BER (0.05 decade in this example) but yields a significant improvement in ATI performance over the longer term (0.1 decade after 1000 adjacent track writes in this example). This is also visualized in the graph of FIG. 3, which shows target track BER and BER loss at the adjacent tracks as a function of laser power for a HAMR device according to an example embodiment. Curve 302 represents mean squeezed BER (y-axis on left side) for the tested track and curve 304 represents the BER loss of an adjacent track (y-axis on right side). Comparing these two curves, the slope of the squeezed BER curve 302 is relatively flat when compared to the slope of the ATI loss curve 304 near the minima of the squeezed BER, e.g., between 95% and 105% laser current. This means that some initial BER loss can be traded off for a more significant improvement in ATI performance.

Figure 4:
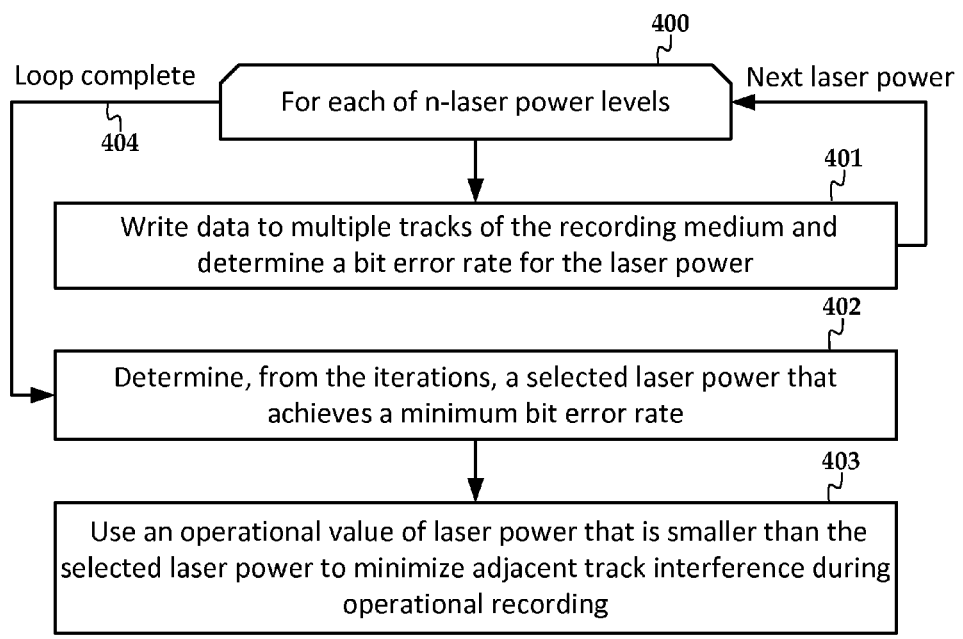
FIGS. 4 and 5 are flowcharts of methods according to example embodiments.

In reference now to FIG. 4, a flowchart illustrates a method according to an example embodiment. The method involves changing a laser power applied to a recording head to record data to a heat-assisted recording medium for a plurality of iterations, as indicated by loop limit 400. Each iteration involves, via the recording head at each laser power, writing 401 multiple tracks (e.g., three tracks) to the recording medium (e.g., at a nominal or reduced track pitch) and determining a bit error rate (e.g., for the middle of three tracks) for each laser power. After the iterations are complete (path 404), a selected laser power $IOP_1$ that achieves a minimum bit error rate $BER_{min}$ is determined 402 from the iterations. An operational value of laser power $IOP_2$ that is smaller than the selected laser power $IOP_1$ is used 403 during operational recording to reduce adjacent track interference, e.g., adjacent track interference resulting from repeated writes to a single track.

Figure 5:
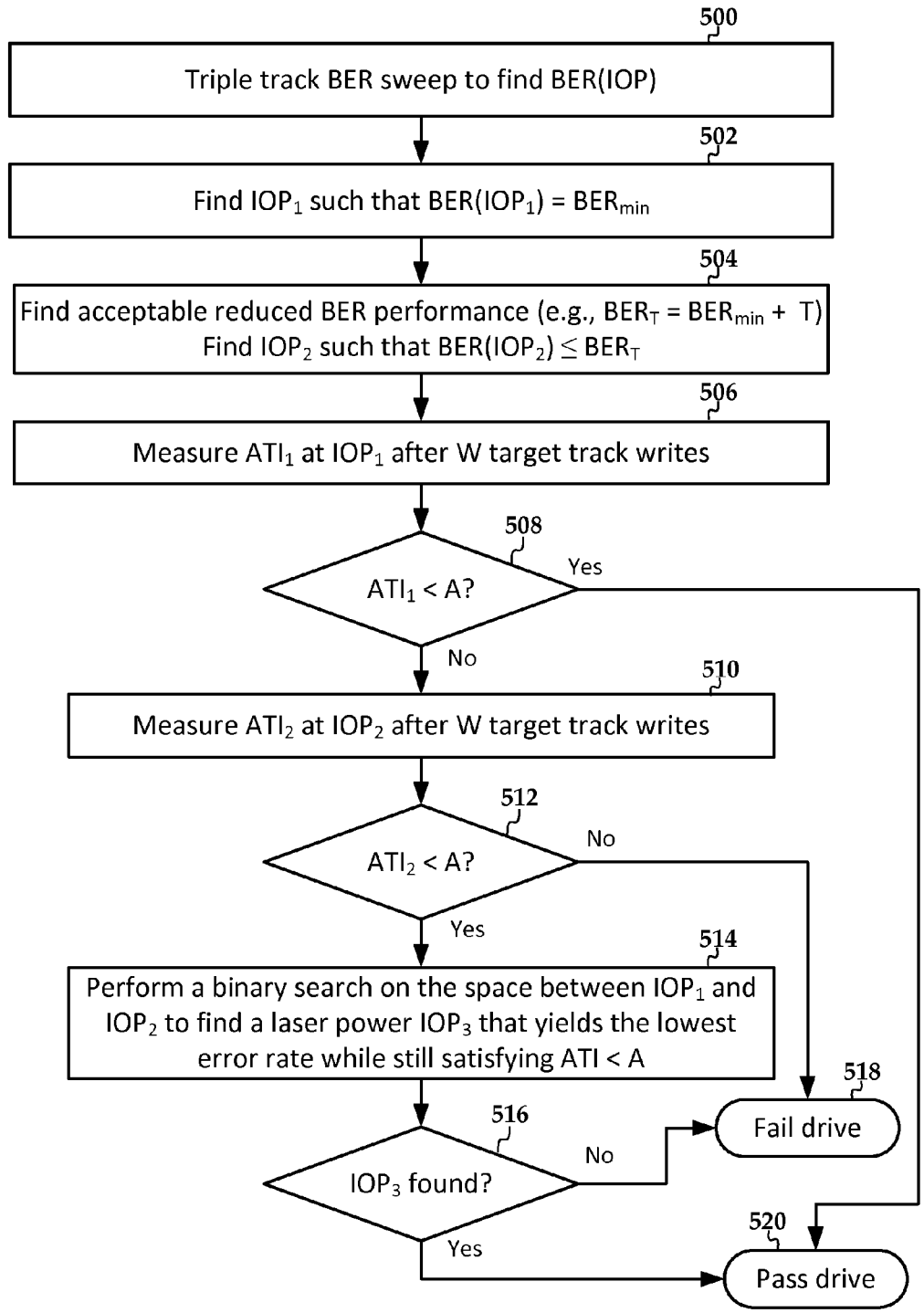

In reference now to FIG. 5, a flowchart illustrates a more detailed procedure for setting laser power according to an example embodiment. At block 500, a squeezed or unsqueezed triple-track BER sweep is performed using different values of laser current. This will result in a function BER(IOP), where IOP is a measure of laser power. In this example, IOP refers to a current that is added to a bias current of a laser, the added current activating the laser to an operational point that heats the media. It will be understood that an analogous BER function may be expressed as dependent on any parameter used to change laser power (e.g., current, voltage, digital-to-analog converter input, etc.). The parameter may be used instead of IOP in the description herein.

Figure 6:
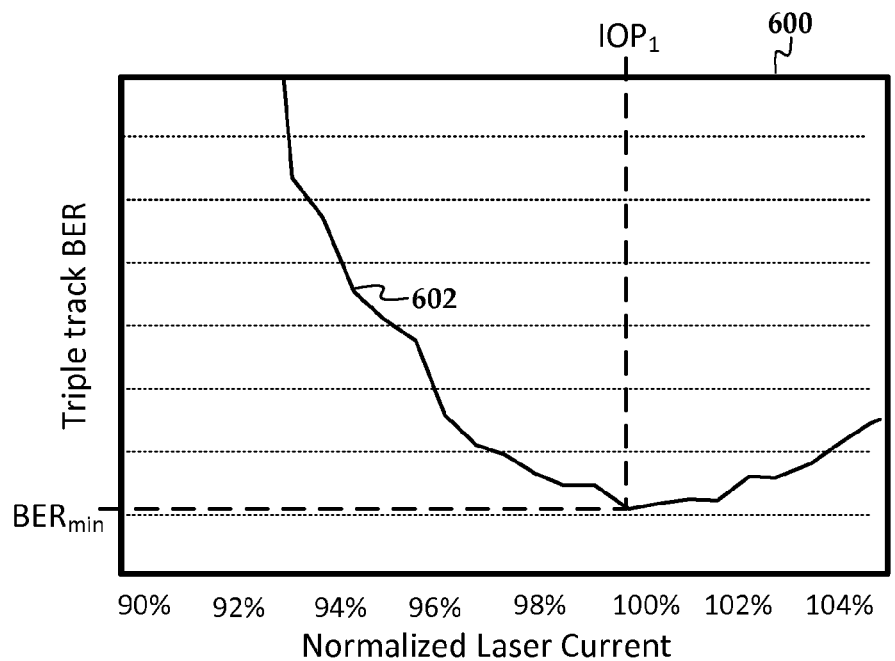
FIGS. 6 and 7 are graphs showing selection of laser power based on bit error rate according to an example embodiment.

An example of triple-track BER function as a function of IOP is shown in the graph 600 of FIG. 6. Curve 602 can be represented as a continuous or discrete function, e.g., list of ordered pairs of the form (IOP, BER). The values (e.g., ordered pairs) are stored for later use. For example, the function BER(IOP) could be a lookup table to a stored list of ordered pairs, could provide an estimate based on a list of ordered pairs (e.g., interpolation, curve fit), etc.

At block 502 of FIG. 5, a laser current setting is found that corresponds to a point at or near the minimum of curve 602. This laser current value will be designated $IOP_1$ and an associated BER will be designated $BER_{min}$. An example of these values is also shown in the graph 600 of FIG. 6. In this example, measured data points correspond to $BER_{min}$ and $IOP_1$, however $BER_{min}$ may not be required to be a discrete measured point, and in some cases $BER_{min}$ may not be the minimum measured point in the curve 602. For example, the curve 602 may be smoothed to reduce the effects of outliers, in which case $BER_{min}$ may be estimated based on a smoothed/averaged curve, curve fit, etc., instead of the actual measurements. The value of $IOP_1$ may also be estimated (e.g., interpolated) based on this smoothed curve.

At block 504 of FIG. 5, an acceptable reduction in BER performance is found. In this example, this reduced performance is expressed as $BER_T$, which is a value of maximum allowable BER due to decreasing laser current in order to accommodate for ATI effects. The laser $IOP_2$ is the laser current setting that has an error rate closest to $BER_T$ without going over. An example of $BER_T$ and $IOP_2$ is shown in the graph 700 of FIG. 7, which includes the curve 602 from FIG. 6.

Figure 7:
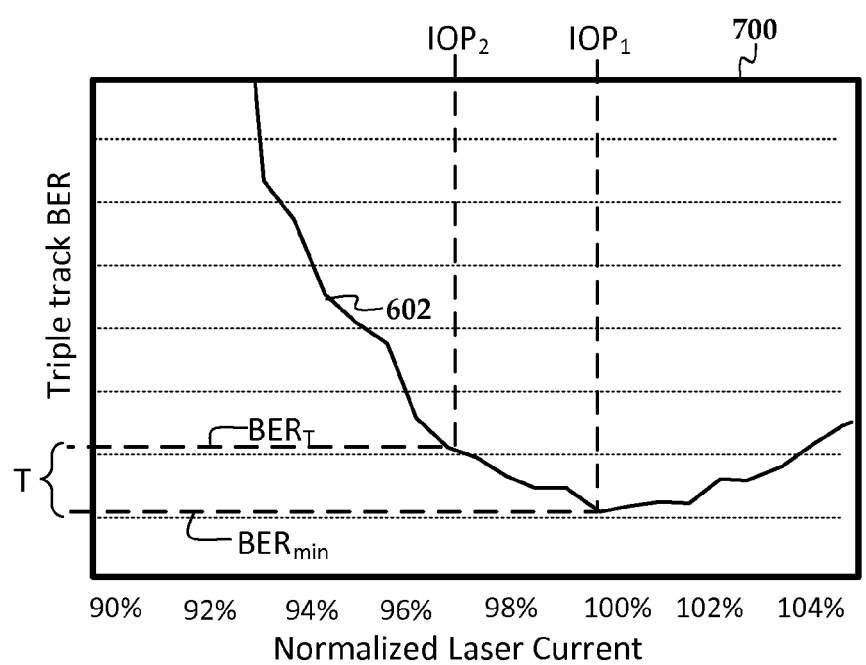

As illustrated in FIG. 7, one formula that may be used to find acceptable BER is $BER_T=BER_{min}+T$, where T is the maximum allowable triple-track error rate loss due to decreasing laser current. The value of T may be found based on a difference between the minimum squeezed or unsqueezed triple-track BER and a maximum allowable value, this difference T also being referred to as a BER margin. There may be other ways to determine $BER_T$. For example, $BER_T$ may be a device-dependent maximum BER or zone-dependent maximum BER, presumably one greater than $BER_{min}$.

At block 506 of FIG. 5, ATI is measured with laser current set to $IOP_1$, the final value of ATI being designated as $ATI_1$. Recall that $IOP_1$ resulted in a minimum value of triple-track BER (or approximately so). The $ATI_1$ measurement provides an error rate loss due to adjacent track interference and is determined based on performing W-writes to a middle track of a set of three adjacent tracks at an unsqueezed pitch, and measuring BER at the outside tracks The $ATI_1$ in this example is taken from the outside track having the largest BER loss. The number of track writes W may be system dependent, e.g., in the range of 40-100 writes. The value of $ATI_1$ may be determined from the multiple writes in a number of ways, such as an average BER loss over x-writes where x≤W, maximum measured BER loss, asymptotic estimate of maximum BER loss, etc. At block 508, $ATI_1$ is tested against a maximum specified value of BER loss due to ATI, the maximum value being designated as A. If $ATI_1$ is less than A (block 508 returns "yes"), then the drive is capable at this laser current setting (ION and passes the test, as indicated by block 520. If this is the case, then $IOP_1$ is used as the operational laser current.

Figure 8:
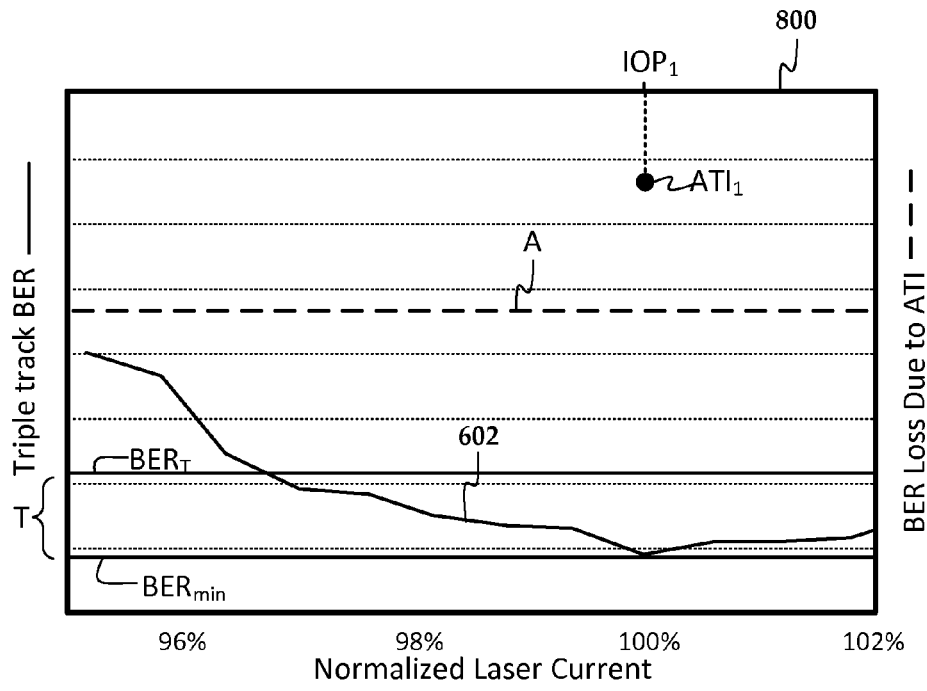
FIGS. 8, 9, and 10 are graphs showing further selection of laser power based on adjacent track interference according to an example embodiment.

An example of a measurement of $ATI_1$ at $IOP_1$ is shown in the graph 800 of FIG. 8. In graph 800, the triple-track BER 602 (solid lines, left hand y-axis) from FIGS. 6 and 7 is superimposed over ATI measurements (dashed lines, right hand y-axis). As seen in this graph, $ATI_1$ is greater than or equal to A, which corresponds to block 508 of FIG. 5 returning "no." In such a case, a second measurement of ATI (ATI$_2$) is made as indicated by block 510 of FIG. 5. In FIG. 5, ATI$_2$ is measured similarly to ATI$_1$, except using a different laser current, IOP$_2$, that was determined at block 504. If ATI$_2$ is greater than or equal to A, which corresponds to block 512 of FIG. 5 returning "no," then the drive has failed, as indicated by block 518.

Figure 9:
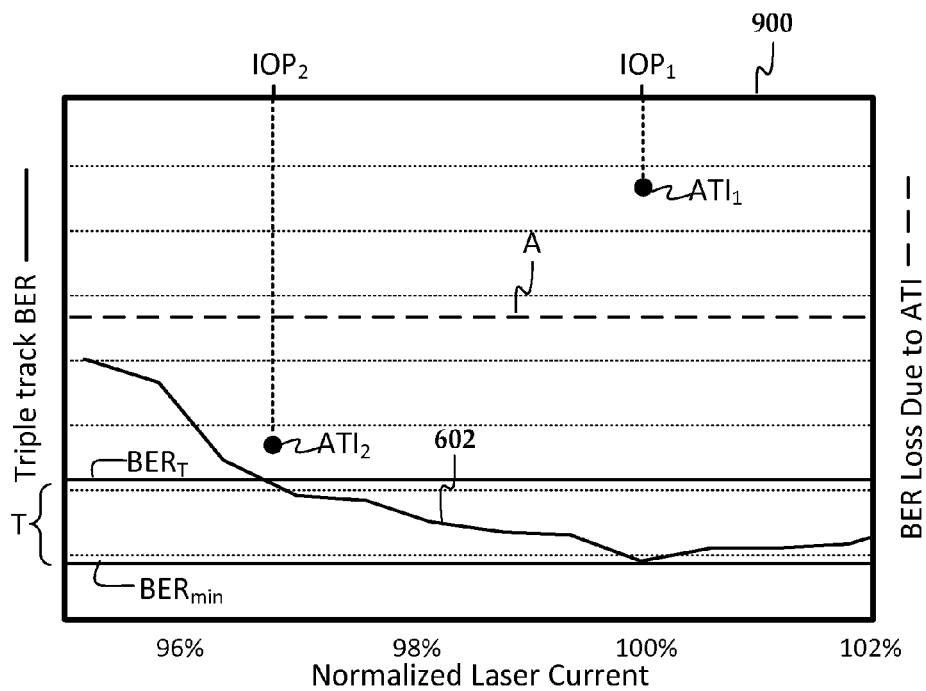
Figure 10:
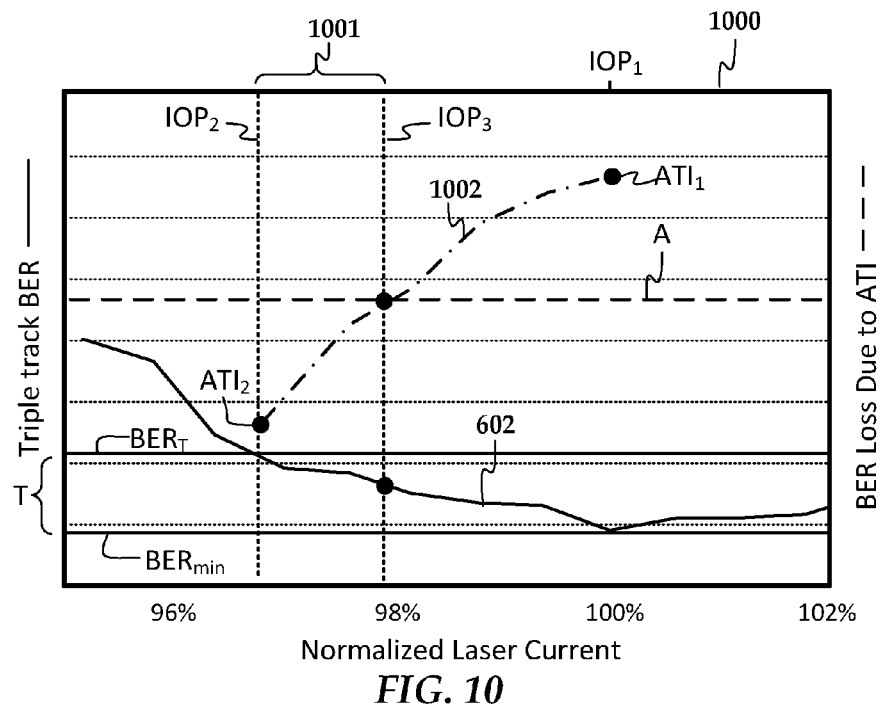

In graph 900 of FIG. 9, an example is shown where block 512 of FIG. 5 returns "yes." As can be seen in the graph 900, using IOP$_2$, the BER is at the allowable limit BER$_T$, and ATI$_2$ is below A. Therefore there is a range of IOP that satisfies both BER<BER$_T$ and ATI<A. The IOP range 1001 for this example is shown in graph 1000 of FIG. 10. As shown in graph 1000, IOP$_2$ is where BER=BER$_T$ and IOP$_3$ (the other end of the IOP range 1001) is where ATI=A. In practice, the measurements of ATI and BER may be performed at discrete values of IOP, and so the bounds of the IOP range 1001 may be defined by BER≈BER$_T$ and ATI≈A, where BER≤BER$_T$ and ATI≤A.

In reference again to FIG. 5, after it is determined that ATI$_2$ is less than A (block 512 returns "yes"), then a binary search may be performed as indicated by block 514. This search finds a laser current setting that yields the lowest error rate while still satisfying the ATI loss spec of A. In this case, that search would select IOP$_3$, or a value nearby, as the operational current. The binary search generally uses currents between IOP$_1$ and IOP$_2$ to search the ATI data 1002 shown in graph 1000 of FIG. 10. The entire curve 1002 shown in graph 1000 need not be measured, only a subset of points around the indicated IOP range 1001. In other embodiments, the operational laser current may be selected using other criteria. For example, a midway point of the IOP range 1001 may be selected as the operational laser current to balance BER with ATI. In other embodiments, a current value equal or close to IOP$_2$ may be used to minimize ATI at the expense of initial triple-track BER.

Assuming an operational current (IOP$_3$ in this example) is found as indicated by block 516 of FIG. 5, then the drive passes as indicated by block 520, otherwise fails as indicated by block 518. Although the procedure may indicate a fail status at block 518, this does not necessarily mean the drive cannot be used. For example, other parameters may be changed that decrease ATI and BER, while making other tradeoffs, e.g., reducing areal density of the hard drive. For example, linear bit density may be decreased (resulting in fewer bits per unit of track length) to ensure more reliable writing and reading of bits. In such a case, reducing linear bit density may reduce the overall drive capacity, and this may be compensated for, e.g., by lowering the advertised capacity of the drive, reducing overprovisioned storage space (if overprovisioning is used), increasing capacity of other tiers of storage (e.g., where the drive is a hybrid device that uses flash memory together with magnetic disks), etc.

As noted above, there may be a number of ways to determine allowable levels of BER. Finding meaning in the difference between two error rate measurements can depend largely on the magnitude of the measurements. For example, the difference between −3.0 and −2.8 will not be the same as the difference between −2.2 and −2.0. For this reason, the error rate comparison specs used in the algorithm may be some function of the magnitude of triple-track squeezed (or unsqueezed) BER. In Table 1 below, some example, non-limiting, parameters used in the above-described algorithm are provided. Note that the maximum triple-track BER loss (T) is a fraction of the available BER margin (M) for this region (e.g., track, zone, etc.). The BER margin is the difference between the minimum triple-track BER for the region (e.g., BER$_{min}$) and a maximum value, BER$_{max}$, which may be a maximum for the device as a whole.

TABLE 1

| Parameter | Example value |
|---|---|
| Maximum Tolerable Error Rate (BER$_{max}$) | −2.0 |
| BER Margin (M) | BER$_{max}$ − BER$_{min}$ |
| Maximum Triple-Track BER Loss (T) | 0.4 * M |
| Maximum BER Loss Due To ATI (A) | 0.4 * M |
| Number of ATI Target Track Writes | 64 |

Figure 11:
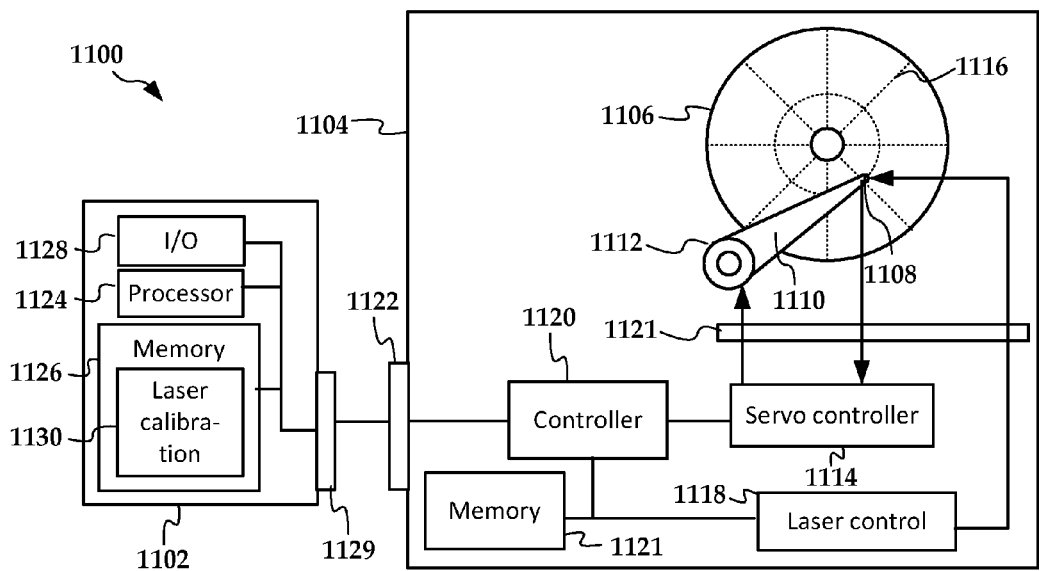
FIG. 11 is a block diagram of a system and apparatus according to an example embodiment.

In reference now to FIG. 11, a block diagram illustrates components of a testing system 1100 according to an example embodiment. The system 1100 includes an optional testing apparatus 1102 and tested hard disk drive device 1104. The hard drive 1104 includes a magnetic disk 1106 used as a recording media. One or more HAMR read/write heads 1108 are mounted to an arm 1110 that is driven radially via a voice coil motor 1112 and optionally via a microactuator (not shown). A servo controller 1114 reads servo marks 1116 on the disk 1106 via the read/write heads 1108. The servo marks 1116 facilitating locating where (e.g., which track) the read/write heads 1108 are located.

A laser controller 1118 provides signals to energy sources (e.g., laser diodes) of the read/write heads 1108. The energy source heats the magnetic disk 1106 during write operations in response to the signals. The laser controller 1118 may obtain feedback from sensors located on the read/write heads 1108 or elsewhere, such as photodiodes, thermal sensors, etc. A controller 1120 provides high-level control of operations of the hard drive device 1104, including laser control and servo control. The controller 1120 may facilitate operations of other components not shown, such as read/write channels, disk motor control, power distribution, etc. Generally, interface circuitry 1121 facilitates communications between the various controllers and other electrical components (e.g., voice coil motor 1112, read/write heads 1108). Such circuitry 1121 may include, but is not limited to preamplifiers, amplifiers, filters, analog-to-digital converters, digital-to-analog converters, power supplies, encoders, decoders, read/write channels, etc.

The hard drive device 1104 includes a host interface 1122 for communicating with external devices, including the testing apparatus 1102. The testing apparatus 1102 may include conventional computing hardware, such as a processor 1124, memory 1126, and input/output (I/O) circuitry 1128. The tester includes an interface 1129 that may provide electrical and mechanical coupling to the hard drive device 1104. The tester 1102 is at least configured (e.g., via instructions stored in memory 1126) to perform calibration and/or qualification tests on the hard drive device 1104. The instructions include a laser calibration module 1130 that is configured to perform determination of operational laser current as described herein.

The laser calibration module 1130 may send commands via the hard drive device's host interface 1122 or other I/O interface. These commands cause the hard drive device 1104 to perform an optimization during a factory process, e.g., qualification testing. The optimization involves incrementing a laser power applied to the recording head 1108 to record data to the heat-assisted recording medium 1106 for one or more iterations. Each iteration involves, at each laser power writing multiple adjacent tracks on the recording medium (e.g., at 0%-15% less than a nominal pitch for a particular radially defined zone) and determining a bit error rate at each laser power, e.g., for a middle track of three adjacent tracks. Based on the iterations, a selected laser power is found that achieves a minimum bit error rate. An operational value of laser power is used that is smaller than the selected laser power to minimize adjacent track interference during operational recording. The controller 1120 of the hard drive device 1104 may store the operational values in a memory 1121 (e.g., system register) and these may be referenced (e.g., via the laser controller 1118) during reading and writing operation of the device 1104.

In will be understood that the above calibration may be performed on the hard drive device 1104 without involvement of the testing apparatus 1102. For example, the instructions of the laser calibration module 1130 used to perform the above-described procedures may be included in the drive's memory 1121, e.g., as part of a firmware image. The calibration procedure may be triggered during the factory process, and the device 1104 may internally calibrate the laser. These instructions may be idled, disabled, or erased from the device 1104 before operation, or may be used later during operation of the device 1104. For example, the hard disk device 1104 may be able to periodically re-run the laser calibration due to detected changes in the laser or other optical components of the read/write heads 1108. If this calibration finds a different value laser current that improves BER and ATI performance, the new laser current may be stored in the memory 1121 for future recording operations.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    changing a laser power applied to a recording head to record data to a heat-assisted recording medium for a plurality of iterations, each iteration comprising, via the recording head at each laser power, writing multiple adjacent tracks to the recording medium and determining a bit error rate (BER) for at least one of the adjacent tracks at each laser power;
    determining a first laser power that achieves a minimum BER of the iterations; and
    using an operational value of laser power that is smaller than the first laser power to reduce adjacent track interference during operational recording.

2. The method of claim 1, where the operational value of the laser power results in an operational BER that is greater than the minimum BER and less than or equal to a maximum acceptable BER ($BER_T$) such that $BER_T = BER_{min} + T$, wherein T is a maximum allowable triple-track error rate loss and $BER_{min}$ in is the minimum BER of the iterations.

3. The method of claim 1, further comprising, after determining the first laser power:
    determining a second laser power that results in a BER that is less than or equal to a maximum acceptable BER;
    determining that using the second laser power results in an a level of adjacent track interference that is below a maximum specified value, the operational value of laser power being greater than or equal to the second laser power.

4. The method of claim 3, wherein the level of adjacent track interference is determined by repeatedly writing to a middle track of three tracks, the level of adjacent track interference corresponding to a BER loss of at least one surrounding track of the three tracks.

5. The method of claim 3, further comprising determining a third laser power that is between the first and second laser powers, the operational value of laser power being set to the third laser power.

6. The method of claim 5, wherein the third laser power results in the level of the adjacent track interference being approximately equal to the maximum specified value.

7. The method of claim 1, wherein the method is performed during qualification testing of a hard disk device that comprises the heat-assisted recording medium.

8. The method of claim 1, wherein the method is performed during operation of a hard disk device that comprises the heat-assisted recording medium, the operation compensating for optical degradation of the recording head.

9. The method of claim 1, wherein each iteration comprises writing the multiple adjacent tracks of the recording medium at a squeezed track pitch.

10. A method comprising:
    determining a bit-error rate (BER) function, the BER function defining a triple-track BER as a function of laser power applied to a recording head that records data to a heat-assisted recording medium;
    determining a first laser power that achieves a minimum BER of the BER function;
    determining a second laser power that is less than the first and that results in a level of adjacent track interference for repeated writes to a single track that is at or below a maximum specified value of adjacent track interference; and
    using the second laser power as an operational laser power for recording to the heat-assisted recording medium.

11. The method of claim 10, further comprising determining a third laser power that is between the first and second laser powers, the operational value of laser power being set to the third laser power.

12. The method of claim 11, wherein the third laser power results in the level of the adjacent track interference being approximately equal to the maximum specified value of adjacent track interference.

13. The method of claim 10, where the second laser power results in the squeezed, triple-track BER being less than or equal to $BER_{min} + T$, wherein T is a maximum allowable triple-track error rate loss and $BER_{min}$ is the minimum BER of the BER function.

14. The method of claim 10, wherein the level of adjacent track interference is determined by repeatedly writing to a middle track of three tracks, the level of adjacent track interference corresponding to a BER loss of at least one surrounding track of the three tracks.

15. The method of claim 14, wherein the middle track is written to for 40 or more times, and wherein the BER loss is a maximum BER loss of the surrounding track for the 40 or more writes.

16. An apparatus comprising: a laser controller configured to apply power to a laser of a recording head to record data to a heat-assisted recording medium; and
a controller coupled to the laser controller and configured to:
change the laser power for a plurality of iterations, each iteration comprising, via the recording head at each laser power, writing multiple adjacent tracks to the recording medium and determining a bit error rate (BER) for at least one of the adjacent tracks at each laser power;
determine a first laser power that achieves a minimum BER of the iterations; and
use an operational value of laser power that is smaller than the first laser power to reduce adjacent track interference during operational recording.

17. The apparatus of claim 16, wherein the controller is further configured to, after determining the first laser power:
determine a second laser power that results in a BER at a reduced track pitch that is less than or equal to a maximum acceptable BER;
determine that using the second laser power results in a level of adjacent track interference that is below a maximum specified value, the operational value of laser power being greater than or equal to the second laser power.

18. The apparatus of claim 17, wherein the level of adjacent track interference is determined by repeatedly writing to a middle track of three tracks, the level of adjacent track interference corresponding to a BER loss of at least one surrounding track of the three tracks.

19. The apparatus of claim 18, wherein the middle track is written to for 40 or more times, and wherein the BER loss is a maximum BER loss of the surrounding track for the 40 or more writes.

20. The apparatus of claim 17, wherein the controller is further configured to determine a third laser power that is between the first and second laser powers, the operational value of laser power being set to the third laser power, the third laser power resulting in the level of the adjacent track interference being approximately equal to the maximum specified value.

* * * * *